May 8, 1951
F. HUGGLER
2,551,744
GUARD ATTACHMENT FOR THE WHEELS OF
AGRICULTURAL IMPLEMENTS
Filed July 13, 1949
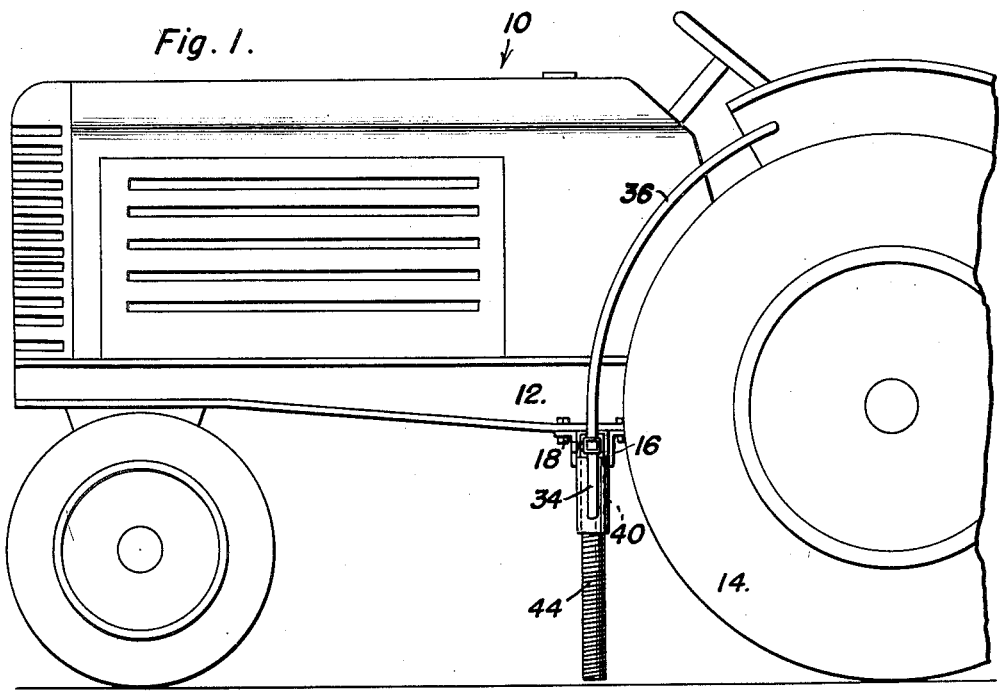
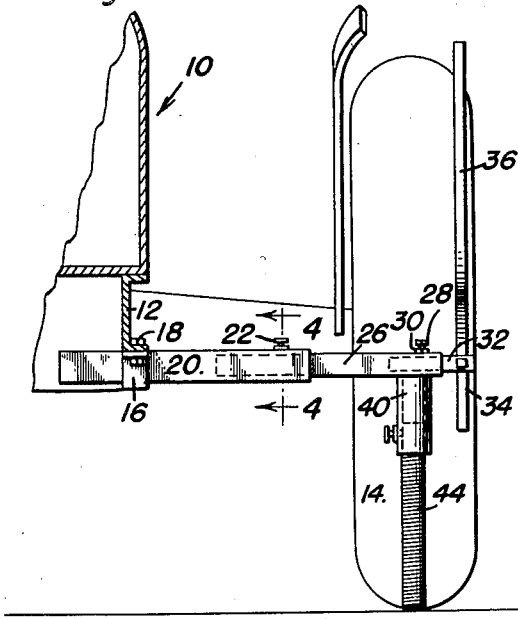
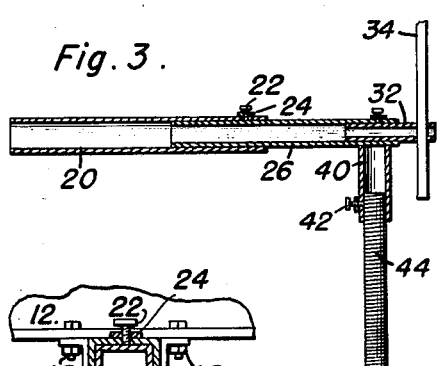
Inventor
Fred Huggler Patented May 8, 1951

2,551,744

UNITED STATES PATENT OFFICE 2,551,744

GUARD ATTACHMENT FOR THE WHEELS OF AGRICULTURAL IMPLEMENTS

Fred Huggler, Osceola, Nebr.

Application July 13, 1949, Serial No. 104,466

5 Claims. (Cl. 280—160)

This invention comprises novel and useful improvements in a guard attachment for the wheels of agricultural implements and more specifically pertains to an appliance which may be readily applied to existing farm tractors or any other implements used for tending or harvesting row crops for preventing the wheels thereof from damaging row crops such as corn, soy beans, cotton or the like during various agricultural operations or harvesting thereof.

The primary object of this invention is to provide an attachment which is suitable for application to farm tractors and implements to prevent the wheels thereof from damaging row crops such as corn during passage of the tractor or implement.

A further object of the invention is to provide an attachment in conformity with the preceding object which is inherently capable of adjustment to fit various tractors and other wheeled farm implements, and to adjust guard elements for most efficient position with reference to the wheels.

A final important object of the invention to be specifically enumerated herein, is to provide an attachment for tractors and other wheeled farm implements in conformity with the foregoing objects which shall be of inexpensive and lightweight construction, easily applied to or removed from a tractor or wheeled implement and adjusted thereon, and which shall be durable and efficient for the purposes intended.

These, together with various ancillary features and objects of the invention which will later become apparent as the following description proceeds, are attained by this invention, a preferred embodiment of which has been illustrated by way of example only in the accompanying drawings, wherein:

Figure 1 is a fragmentary side elevational view of a convention form of farm tractor showing a preferred embodiment of this invention applied thereto;

Figure 2 is a fragmentary vertical transverse sectional detail view through the tractor shown in Figure 1, and showing the position of the attachment applied thereto in front elevation;

Figure 3 is a vertical transverse sectional view through the attachment itself, a part thereof being broken away; and Figure 4 is a fragmentary vertical transverse sectional view taken substantially upon the plane of the sectional line 4—4 of Figure 2.

Referring now more specifically to the accompanying drawings, wherein like numerals designate similar parts throughout the various views, it will be seen that the numeral 10 designates generally a farm tractor which may be of any conventional and known type. This tractor includes a frame member 12 and a wear wheel 14 with which the attachments forming the subject matter of this invention are to be operatively associated as set forth hereinafter.

Although for convenience of illustration the attachment has been shown as applied to only one of the rear wheels of a tractor, it is to be understood that the same may be applied to both wheels in accordance with the purposes and intentions of this invention and that although the use with a tractor wheel only has been illustrated, the attachment may be applied to any wheeled farm implement.

Suitably mounted upon the frame 12 in any desired manner as by means of one or more clamps 16 secured to the undersurface of the frame member 12 as by fastening bolts 18 is a horizontally and laterally extending tubular support 20 which is preferably of non-circular cross section, and may be conveniently of a square cross sectional contour. Upon its open outer end, the tubular support 20 is provided with a screw-threaded fastening screw 22 which extends through a tubular boss 24 welded or otherwise secured to the upper surface of the tubular support 20, the screw 22 constituting a fastening means for adjustably securing a tubular extension which is telescopingly and slidingly received in the tubular support 20. This tubular extension 26 may be of the same cross sectional contour as the tubular support 20, and in turn is likewise open at its outer extremity, and is similarly provided adjacent its outer end with an adjusting screw 28 likewise screw threaded in a boss 30 welded or otherwise attached to the upper surface of the extension. In its turn, a shaft 32 which may be in the form a tubular sleeve or the like is slidingly received in the outer extremity of the extension 26, this shaft 32 having a vertically extending aperture therethrough for receiving the shank 34 of an upwardly extending guard strip 36 which is preferably of arcuate shape conforming to the curvature of the wheel 14 and adapted to be spaced slightly radially from the periphery thereof as shown in Figure 1. It is to be understood that any suitable means may be provided whereby the shank 34 of the guard 36 may be vertically adjusted in its supporting shaft 32, the latter being longitudinally adjustable in the extension 26 which in turn is longitudinally adjustable in the support 20.

Preferably adjacent its outer extremity, the extension 26 has a depending socket member 40 welded or otherwise rigidly attached to the undersurface thereof, this socket member being in the form of a tubular sleeve which may be of circular cross section if desired, and which at its lower extremity is provided with a set screw 42 by means of which a depending flexible guard rod 44 comprised of a spring coil and is vertically adjustably carried by the socket member.

From the foregoing, the construction and operation of the attachment will be readily understood. The attachment can readily be adjusted horizontally to properly position the guard rod 44 in front of a tractor wheel, while the upstanding guard member 34 is likewise properly adjusted adjacent the outer surface of and overlying the periphery of the tractor wheel. When so adjusted, the member 44 extending into close contact with the ground will brush corn stalks even when lying prone upon the ground away from the path of travel of the wheels 14 to prevent crushing of the same by the wheels, while the upstanding guard member 36 will prevent corn stalks rubbing against the wheels and having ears of corn detached therefrom by passage of the wheels.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to falling within the scope of appended claims.

Having thus disclosed and described the invention, what is claimed as new is as follows:

1. A guard for the wheels of agricultural implements comprising a tubular horizontal support adapted to be mounted on an implement frame, a tubular extension longitudinally telescoping in said support, a tubular socket depending from said extension, a guard rod slidably secured in said socket, a shaft slidable in the end of said extension and an upwardly extending guard carried by said shaft and adapted to extend adjacent to the upper portion of a vehicle wheel.

2. The combination of claim 1 wherein said support and extension are of non-circular cross section and means for securing said support and extension in adjusted position.

3. The combination of claim 1, wherein said guard rod is longitudinally flexible in all directions.

4. In a wheeled vehicle having a support frame, a wheel guard attachment comprising a horizontal support, means for mounting said support transversely of the frame of a vehicle, an extension longitudinally adjustably mounted on said support and adapted to extend forwardly of a vehicle wheel, a socket depending from said extension, a guard rod slidably received in said socket, a shaft longitudinally adjustably mounted on the end of said extension and an upwardly and rearwardly extending guard carried by said shaft and adapted to overlie the wheel.

5. In combination with a wheeled vehicle having a support frame, a wheel rotatably attached to said frame, a wheel guard attachment comprising a support mounted transversely of said frame, an extension longitudinally adjustably mounted on said support and extending forwardly of said wheel, a socket depending from said extension, a guard rod slidably received in said socket, a shaft longitudinally adjustably mounted on the end of said extension and an upwardly extending arcuate guard attached to said shaft and overlying said wheel.

FRED HUGGLER.

REFERENCES CITED

The following references are of record in the file of this patent:

UNITED STATES PATENTS

| Number | Name | Date |
| --- | --- | --- |
| 941,170 | Roberts | Nov. 23, 1909 |
| 1,046,104 | Palmer | Dec. 3, 1912 |
| 1,660,934 | O'Brien | Feb. 28, 1928 |
| 1,834,441 | Archer | Dec. 1, 1931 |